United States Patent [19]
Roberts et al.

[11] 3,760,294
[45] Sept. 18, 1973

[54] THERMAL MIXING GAS LASER

[75] Inventors: Thomas G. Roberts; Guilford J. Hutcheson; Charles M. Rust, all of Huntsville, Ala.

[73] Assignee: The United States of America as represented by the Secretary of the Army, Washington, D.C.

[22] Filed: Sept. 27, 1971

[21] Appl. No.: 183,834

[52] U.S. Cl. ............................. 331/94.5, 330/4.3
[51] Int. Cl. ......................... H01s 3/09, H01s 3/22
[58] Field of Search ..................... 331/94.5; 330/4.3

[56] References Cited
UNITED STATES PATENTS
3,694,770  9/1972  Burwell et al. .................... 331/94.5

OTHER PUBLICATIONS
Bronfin et al., Applied Physics Letters, Vol. 16, No. 5, Mar. 70, pp. 214–217

Spencer et al., Applied Physics Letters, Vol. 16, No. 10, 15 May 70, pp. 384–386

Primary Examiner—David Schonberg
Assistant Examiner—Robert J. Webster
Attorney—Harry M. Saragovitz et al.

[57] ABSTRACT

A laser having a gas generating section that delivers a flow of hot nitrogen gas ($N_2$) to a nozzle. The $N_2$ is expanded through the nozzle to achieve supersonic flow of the $N_2$. The nozzle includes injection ports positioned so as to inject cold carbon dioxide gas ($CO_2$) into the $N_2$ flow at a point in the nozzle where flow is supersonic, just downstream of the throat. The injection of a cold gas enhances population inversion in the cold gas. Thorough mixing of the hot and cold gases occurs prior to exit of the gases from the nozzle. The gases exhaust from the nozzle into a lasing chamber wherein laser energy is extracted from the flow.

4 Claims, 4 Drawing Figures

Patented Sept. 18, 1973

Thomas G. Roberts
Guilford J. Hutcheson
Charles M. Rust,
INVENTORS.

BY Harry M. Saragovitz
Edward J. Kelly
Herbert Berl
Charles C. Wells

Thomas G. Roberts
Guilford J. Hutcheson
Charles M. Rust,
INVENTORS.

THERMAL MIXING GAS LASER

BACKGROUND OF THE INVENTION

This invention relates to gas lasers and more particularly it relates to dynamic gas lasers in which there is a thermal mixing of the gases.

Since the development of the first working lasers, considerable time and effort has been expended in the search for higher output laser systems. The possible applications of high power lasers are unlimited in the fields of communication, manufacturing, construction, medicine, space exploration, and defense. Unfortunately many obstacles exist to the attainment of high power systems. Most lasers have a low efficiency and therefore to obtain high power or high energy outputs, considerbly more energy must be furnished to the system than is extracted. If this energy furnished is electrical, then he system cannot have a large average power and still be portable, as is desired in some cases. The relative size and weight of laser systems, and the availability of materials, have also introduced obstacles to their development.

Despite these obstacles, continuous wave output power has continued to increase from milliwatts, watts, kilowatts, and more recently to tens of kilowatts. New lasing materials, methods of producing population inversions, and coupling procedures have been developed. Detectors, mirrors, windows, and other auxiliary equipment have been adapted for the new systems.

One of the more promising areas now being developed is the field of gas-dynamic lasing systems. Once fully developed, such gas-dynamic systems may be able to operate independently of electrical or other external power sources. Bulky and heavy equipment such as vacuum chambers, pumps, and compressors may be eliminated and a portable, high-power, and relatively simpler laser may result.

In a typical $N_2$-$CO_2$ laser the upper lasing level of the $CO_2$ is very near the first vibrational level of nitrogen. Energy is pumped into the nitrogen, usually through electron bombardment, to populate this upper level. By near resonant collisional transfer of energy the excited nitrogen molecules fill the upper $CO_2$ lasing level, producing a population inversion in the $CO_2$ molecules. In contrast to this gas-dynamic techniques are used to preferentially populate the upper lasing level of $CO_2$ by rapid heating and cooling of the laser gases. If the component laser gases are heated and rapidly cooled, the temperature associated with the vibrational mode of $N_2$ remains almost as high as before cooling for an appreciable length of time. However, the time required for temperatures associated with the rotational and translational energy modes to drop is very short by comparison. There results a relatively high density state of the first vibrational level of $N_2$, which in turn results in the $N_2$ selectively exciting the upper lasing level of the $CO_2$ by collisions.

In a $N_2$-$CO_2$ laser, inversion can be more readily obtained if relativey cold $CO_2$ is added to the heated $N_2$. Selective excitation of the upper lasing level by the excited nitrogen molecules will occur, but initially the lower lasing level will not be populated appreciably by this process. The problem encountered here is that the $N_2$ and $CO_2$ must be well mixed to obtain maximum population of the upper lasing level by collisional transfer, but the gases must not be mixed long enough for the lower lasing level to be thermally populated. Systems operating on this principle have been called "thermal mixing" lasers.

SUMMARY OF THE INVENTION

It has been found that if the nozzle in a gas-dynamic system is used only to "freeze" the vibrational levels of $N_2$ and cold $CO_2$ is injected into the $N_2$ flow at various positions in the flow, then a gas-dynamic thermal mixing laser results. For example, supersonic mixing can take place when the $CO_2$ is injected downstream of the nozzle throat. Near sonic mixing can be accomplished by injecting cold $CO_2$ just upstream of the nozzle throat. When operated in this manner, the laser is not a gas-dynamic laser in the ordinary sense and may more appropriately be called a fast flow thermal laser or a gas-dynamic thermal mixing laser. This approach increases the efficiency of gas-dynamic lasers. When a supersonic nozzle is used to freeze only $N_2$, instead of a $N_2$-$CO_2$, $N_2$-$CO_2$-He or $N_2$-$CO_2$-$H_2O$ mixture, much higher gas mixture temperatures can be used which results in more of the energy being stored in the vibrational mode and leads to higher operating efficiencies.

Accordingly, it is an object of the invention to provide a gas laser utilizing nitrogen ($N_2$) and carbon dioxide ($CO_2$) gases as the lasing materials. The laser consists generally of a hot gas generating section for providing a flow of hot nitrogen and a nozzle section that receives the $N_2$ from the gas generating section and expands it to a supersonic velocity. The nozzle section includes injection ports connected to a source of $CO_2$ for injecting relatively cold $CO_2$ into the $N_2$ flow. The $N_2$ and $CO_2$ are thoroughly mixed in the nozzle and reach a lasing condition. A lasing chamber is connected to the downstream side of the nozzle section and recieves the exhaust therefrom. The lasing chamber disclosed herein is an optical cavity from which a laser beam is extracted.

The $CO_2$ is injected into the nitrogen downstream of the nozzle throat, just after the nitrogen flow has reached supersonic velocity. There results what can be termed a thermal mixing gas dynamic laser or a fast flow thermal laser. The two gases are mixed well enough in the short distance they travel after being combined to obtain maximum population of the upper lasing level of the $CO_2$ by collisional tranfer, but the gases are not mixed long enough for the lower lasing level of the $CO_2$ to be thermally populated. Thus, the gas mixture reaches the lasing chamber in a lasing condition and a laser raction occurs accompained by the extraction of laser energy from the reaction in the lasing chamber.

DETAILED DESCRIPTION OF THE INVENTION

Figure 1:
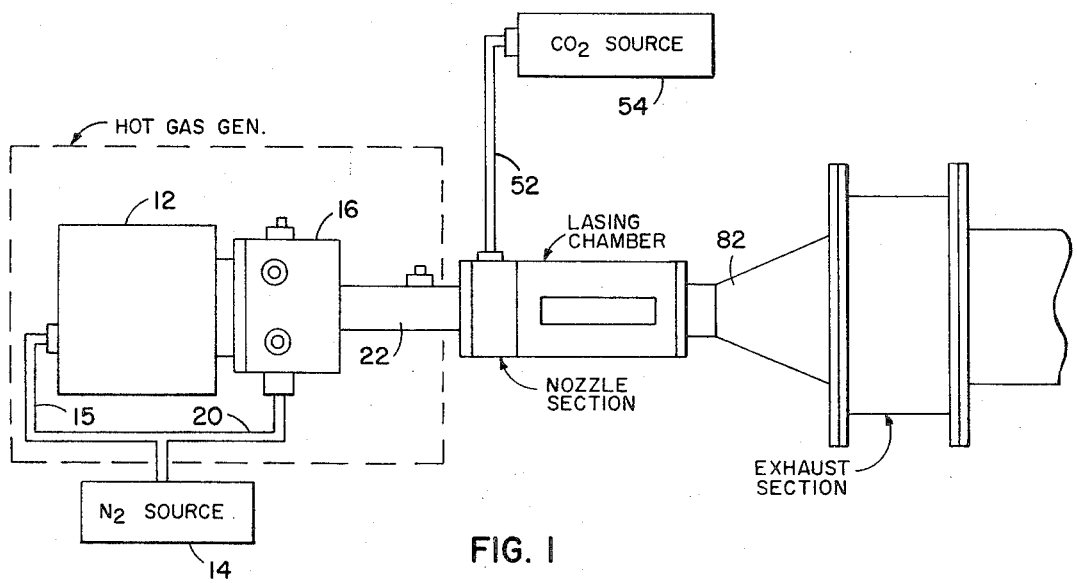
FIG. 1 is a schematic illustration of a laser device constructed in accordance with this invention.

Referring now to the drawings, FIG. 1 illustrates a preferred embodiment of a laser constructed in accordance with the invention. In describing the invention various terms commonly used to describe lasers and laser reactions, such as lasing levels, population inversion, and the like, will be used without explanation as they are terms well known and understood by those skilled in the art. The operation and theory of lasers, including gas lasers, is explained in considerable detail in U. S. Pat. No. 3,302,127, issued Jan. 31, 1967 to Shao-Chi Lin.

The laser includes a hot gas generating section that provides a flow of hot nitrogen to a nozzle section mounted downstream. The gas generator shown includes a conventional electrical arc plasma generator 12, but other gas generating devices such as a chemical gas generator, could be used instead. $N_2$ gas from a suitable source 14 is supplied through conduit 15 to plasma generator 12 wherein it is ionized and heated and exhausted to plenum chamber 16. Only a part of the $N_2$ used is passed through the plasma generator; the remainder is injected into the plenum chamber via conduit 20 as a diluent where it cools the $N_2$ from the plasma generator to a desired temperature. This produces a thermal equilibrium condition in the plenum gases prior to expansion through the nozzle section. The plenum includes a transition section 22 to which the nozzle section is mounted by bolting or other suitable means.

Figure 2:
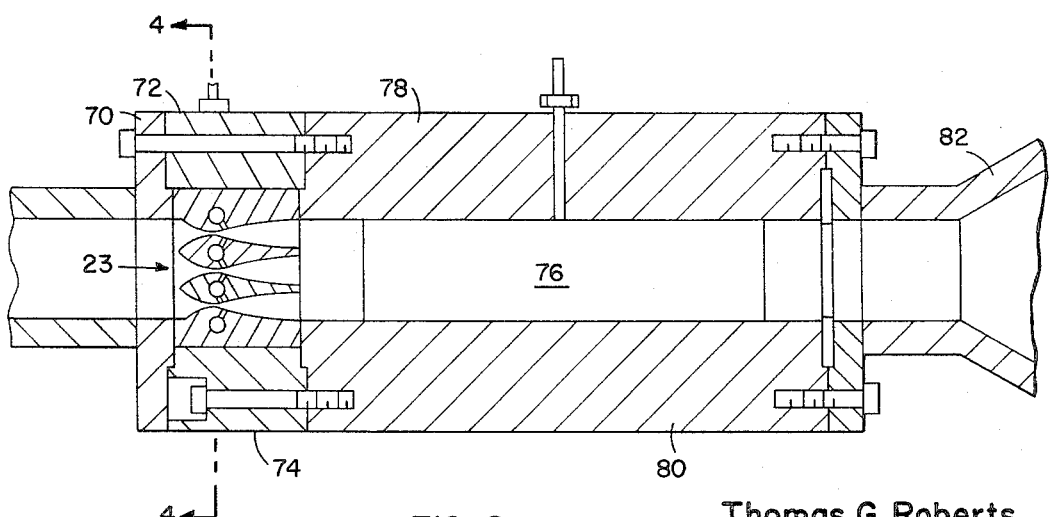
FIG. 2 is an enlarged cross sectional view of the nozzle section and lasing chamber of the laser device shown in FIG. 1.
Figure 3:
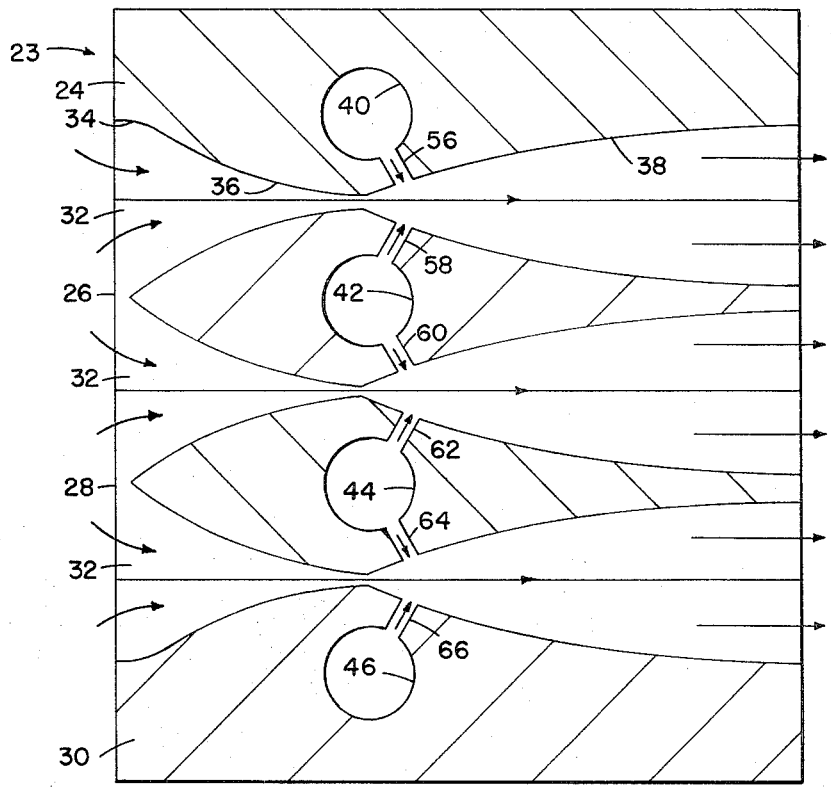
FIG. 3 is a cross-section of the nozzle illustrating the arrangement of gas passageways and injection ports.
Figure 4:
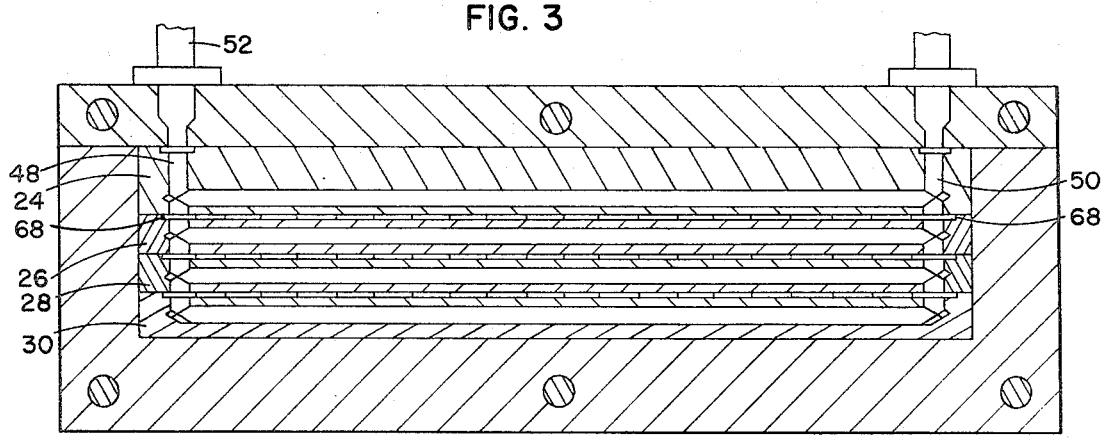
FIG. 4 is a cross section taken along lines 4—4 of FIG. 2.

The nozzle section as more clearly shown in FIGS. 2, 3 and 4, comprises an elongated nozzle piece 23 that is made in four sections 24, 26, 28 and 30 that are stacked for use. When stacked the nozzle piece forms a plurality of elongated slits or channels 32 that form supersonic nozzles. Each channel, see FIG. 3, consists of a converging section 34 that joins a throat section 36 which is terminated by a diverging or exit section 38. Operating conditions of the laser are such that the $N_2$ being expanded through the nozzle reaches supersonic velocity shortly after leaving the throat. Four circular passageways 40, 42, 44 and 46 formed in the nozzle are in communication with passageways 48 and 50, FIG. 4, to form a manifold that is connected via line 52 (FIGS. 1 and 4) to a suitable source 54 of $CO_2$. Passageways 40, 42, 44 and 46 have injection ports 56–66 extending therefrom for injecting the $CO_2$ into the $N_2$ flow. A row of approximately 60 injection ports were used for each of the passageways. Flow direction is shown by arrows in FIG. 3 and, as is apparent, the $CO_2$ is injected just downstream of the throat of each nozzle, a point where the $N_2$ flow is supersonic. O-rings 68 are provided to seal between the nozzle sections in the areas around passageways 48 and 50 to prevent leakage of $CO_2$. The stacked nozzle sections are secured in place by frame members 70, 72 and 74 bolted (see FIG. 2) to the laser chamber. The nozzle can be constructed and arranged so as to have flow channels 32 vertically or horizontally oriented.

The $N_2$ and $CO_2$ are thoroughly mixed in the diverging exit portion of the nozzle. The molecules of the $N_2$ gas have been excited by heating so that when the relatively cold $CO_2$ is injected into the $N_2$ selective excitation of the upper lasing levels of the $CO_2$ molecules occurs, the $N_2$ furnishing the required energy through collision. A population inversion in the upper lasing level of $CO_2$ is obtained. As is well known, when a laser reaction takes place the atoms of the laser materials emit energy and this energy release is accompanied by a relaxation from an upper energy level to a lower energy level.

Lasing chamber 76 is an optical cavity formed by walls 78 and 80. The downstream end of the cavity is closed by a transition conduit 82 that connects the discharge flow from the cavity to a suitable exhaust system. During development of the invention the lasing materials, which included $CO_2$, $N_2$ and in some test runs amounts of $h_2O$ and/or He, were exhausted into a large vacuum chamber. However, the laser could be exhausted to the atmosphere or elsewhere if desired. The particular optical cavity or lasing chamber employed is not a critical feature of this invention and any of several types of lasing chambers having known designs can be utilized. In the apparatus employed in the development and testing of the present invention the optical cavity was formed by two flat gold-plated mirrors (not shown) mounted in the lasing chamber so as to form a part of the wall of the flow channel, with the optical cavity being perpendicular to the flow direction. The energy extracted from the laser reaction taking place in the chamber was coupled out in the form of a laser beam through an array of holes (not shown) in one of the mirrors.

The operation of the device will now be described. The mass flow rates are metered and controlled by the use of sonic orifices (not shown). The back pressure on each orifice is set by the use of dome regulators, also not shown, and is measured and recorded if desired. The mass flow rate of each gas used, as a function of the back pressure, is determined by measuring the rate of increase of pressure in a vacuum tank whose volume was known.

The hot gas generator employs an electric arc device of a conventional type which uses a strong solenoid magnetic field to rapidly rotate the discharge in the electrode gap. This tends to prevent overheating and evaporation of the electrode surfaces. The arc is ignited by a plasma gun starter which produces a small tongue of plasma that shorts the electrode gap.

Nitrogen from source 18 is admitted to the plasma generator where it is converted to a plasma that exhausts to the plenum. In the plenum the plasma is mixed with additional $N_2$ supplied to the plenum as a diluent to the plasma. The mixture in the plenum is in thermal equilibrium by the time it reaches the nozzle section. The gas from the plenum when expanded through the nozzle results in a gas flow having a high mach number and a low pressure. The $N_2$ gas flow reaches supersonic velocity as it leaves the throat nozzle. Thus, at the point where the $CO_2$ is injected, via ports 56–66, the flow is supersonic and enhanced thermal mixing results. Sufficient mixing occurs in the diverging or exit portion of the nozzle to result in a population inversion in the $CO_2$ states. The upper laser levels of the $CO_2$ become most populated by mixing upstream as far as possible, but the lower lasing level will remain deplenished only if mixing occurs very near the lasing chamber which, in this instance, is an optical cavity. Therefore, to produce optimum inversion the point at which mixing occurs must be a compromise between these two incompatible conditions. In the present invention the mixing time is controlled by the length of the nozzle left after $CO_2$ injection takes place. An optimum length is chosen that is the best compromise between the two incompatible conditions mentioned above and there results a laser reaction of maximum energy output. When the lasing materials react in the optical cavity a laser beam is extracted therefrom.

The flow after leaving the optical cavity is exhausted into a vacuum chamber or, if desired, to atmosphere.

While the invention disclosed herein has been described in connection with a $CO_2$-$N_2$ laser the technique of thermal mixing by injecting one, or possibly more, of the lasing materials at the expansion nozzle can be used to good advantage in chemical or hybrid laser devices. For example, tests have been made where oxygen atoms were obtained from the plenum and $CS_2$, carbon disulfide, was added downstream to obtain lasing from CO, carbon monoxide, produced in a chemical reaction of the mixed oxygen and $CS_2$ streams. Also the lasing materials supplied to the nozzle could be obtained from a gas generator of the type wherein one or more materials were reacted or burned to produce a hot gas having desired properties. It will be apparent to those skilled in the art to which this invention pertains that the principles thereof can be used to good advantage in the design and fabrication of a portable, high power laser.

We claim:

1. A dynamic mixing gas laser apparatus that mixes a first and second gas to emit radiation comprising:
    hot gas generating means for raising said first gas to a high temperature, ionized state, and for providing a flow of said gas,
    a source of said first gas connected to said hot gas generating means for supplying said first gas thereto,
    nozzle means connected to said hot gas generating means for receiving the output flow of said first gaS from said hot gas generating means and expanding it to a supersonic velocity,
    said nozzle means including a nozzle piece that forms at least one converging-diverging expansion nozzle, each said expansion nozzle comprising an elongated slit forming a throat of said expansion nozzle, said throat being preceded by an elongated converging cavity on the upstream side thereof and an elongated diverging cavity on the downstream side thereof,
    said nozzle means further including gas injection means for injecting said second gas into the diverging cavity at a point adjacent the throat of the expansion nozzle, for mixing said first and second gases in the diverging cavity of said nozzle for creating an active laser medium with a population inversion therein,
    a source of said second gas connected to said nozzle means for supplying said second gas to said gas injection means, and
    lasing chamber means connected to said nozzle means that includes an optical chamber positioned to receive the active laser medium from the nozzle means immediately after it leaves the diverging cavity of said nozzle for stimulating emission of radiation from said laser medium.

2. The laser apparatus recited in claim 1 wherein said nozzle piece forms a plurality of said converging-diverging nozzles stacked one above the other.

3. The laser apparatus recited in claim 2 wherein said gas injection means comprises manifold means formed in said nozzle piece to receive said second gas and injection ports formed in said nozzle piece and positioned for injecting said second gas from said manifold into the diverging cavity at a point adjacent the throat of the expansion nozzle.

4. The method of achieving an improved radiation emission in a gas laser device wherein at least two gases are employed as the lasing materials, said method comprising the steps of:
    injecting a hot plasma flow of a first gas into a plenum chamber,
    simultaneously injecting a quantity of said first gas into the plenum chamber that is relatively cold to be mixed as a diluent with said plasma to form a hot gas mixture,
    expanding said hot gas mixture through a nozzle having a converging entry section, a throat, and a diverging exit section, to impart a supersonic velocity thereto,
    injecting a second relatively cold gas into the hot gas mixture being expanded through the nozzle at a point adjacent the nozzle throat where the flow of said first hot gas being expanded through the nozzle reaches supersonic velocity for thoroughly mixing the first and second gases are in the diverging exit section of said nozzle to form an active gas laser mixture with a population inversion therein, and
    injecting said supersonically flowing active gas laser medium from said nozzle directly into an optical chamber for stimulating the emission of radiation therefrom.

* * * * *